(12) United States Patent
Zeichfüssl

(10) Patent No.: US 11,371,488 B2
(45) Date of Patent: Jun. 28, 2022

(54) ELECTRIC MACHINE WITH INDEPENDENT ROTOR COOLING DEVICE, GENERATOR ARRANGEMENT AND WIND TURBINE

(71) Applicant: Siemens Aktiengesellschaft, Munich (DE)

(72) Inventor: Roland Zeichfüssl, Ruhstorf a. d. Rott (DE)

(73) Assignee: FLENDER GMBH, Bocholt (DE)

( * ) Notice: Subject to any disclaimer, the term of this patent is extended or adjusted under 35 U.S.C. 154(b) by 216 days.

(21) Appl. No.: 16/484,022

(22) PCT Filed: Jan. 9, 2018

(86) PCT No.: PCT/EP2018/050415
§ 371 (c)(1),
(2) Date: Aug. 6, 2019

(87) PCT Pub. No.: WO2018/145841
PCT Pub. Date: Aug. 16, 2018

(65) Prior Publication Data
US 2019/0390657 A1  Dec. 26, 2019

(30) Foreign Application Priority Data

Feb. 7, 2017 (EP) ..................................... 17154962

(51) Int. Cl.
*H02K 9/16* (2006.01)
*F03D 80/60* (2016.01)
*H02P 6/06* (2006.01)

(52) U.S. Cl.
CPC ............... *F03D 80/60* (2016.05); *H02K 9/16* (2013.01); *H02P 6/06* (2013.01)

(58) Field of Classification Search
CPC .. H02K 9/00; H02K 9/04; H02K 9/08; H02K 9/10; H02K 9/12; H02K 9/16; H02K 9/18;
(Continued)

(56) References Cited

U.S. PATENT DOCUMENTS

2004/0066099 A1* 4/2004 Weeber ..................... H02K 9/12
 310/58
2004/0194497 A1 10/2004 Sasaki et al.
(Continued)

FOREIGN PATENT DOCUMENTS

DE  199 18 040 A1  9/2000
DE  100 52 427 A1  6/2002
(Continued)

OTHER PUBLICATIONS

PCT International Search Report and Written Opinion of International Searching Authority dated Apr. 17, 2018 corresponding to PCT International Application No. PCT/EP2018/050415 filed Jan. 9, 2018.

*Primary Examiner* — Tran N Nguyen
(74) *Attorney, Agent, or Firm* — Henry M. Feiereisen LLC

(57) ABSTRACT

The invention relates to an electric machine (2) comprising a stator (2) and a rotor that can rotate relative to the stator (2), the rotor (3) having a plurality of permanent magnets (5), also comprising a rotor cooling device (8) for cooling the rotor (3), wherein the rotor cooling device (8) comprises at least one cooling device (23) for providing a cooling air flow, said rotor cooling device (8) comprises a control device (22) which is designed to control at least one cooling device (23) for adjusting a coolant power provided by the cooling air flow.

11 Claims, 3 Drawing Sheets

(58) Field of Classification Search
CPC .......... H02K 9/19; H02K 11/00; H02K 11/04;
H02K 11/25; H02P 6/00; H02P 6/06;
F03D 80/00; F03D 80/60; F01P 11/16;
F01P 3/20; F01P 7/16
See application file for complete search history.

(56) References Cited

U.S. PATENT DOCUMENTS

| | | | |
|---|---|---|---|
| 2009/0195091 A1 | 8/2009 | Nakahara et al. | |
| 2011/0181137 A1* | 7/2011 | Kori ........................ | H02K 9/12 |
| | | | 310/59 |
| 2013/0169076 A1* | 7/2013 | Li ............................ | H02K 1/32 |
| | | | 310/52 |
| 2014/0152012 A1* | 6/2014 | Kim ......................... | H02J 3/18 |
| | | | 290/44 |

FOREIGN PATENT DOCUMENTS

| | | |
|---|---|---|
| DE | 102 46 690 A1 | 4/2004 |
| DE | 10 2007 021 723 A1 | 11/2008 |
| DE | 10 2012 112 851 A1 | 6/2014 |
| EP | 2 068 410 A1 | 8/2009 |
| EP | 2 757 668 A1 | 7/2014 |

\* cited by examiner

ELECTRIC MACHINE WITH INDEPENDENT ROTOR COOLING DEVICE, GENERATOR ARRANGEMENT AND WIND TURBINE

CROSS-REFERENCES TO RELATED APPLICATIONS

This application is the U.S. National Stage of International Application No. PCT/EP2018/050415, filed Jan. 9, 2018, which designated the United States and has been published as International Publication No. WO 2018/145841 A1 and which claims the priority of European Patent Application, Ser. No. 17154962.9, filed Feb. 7, 2017, pursuant to 35 U.S.C. 119(a)-(d).

BACKGROUND OF THE INVENTION

The present invention relates to an electric machine having a stator and having a rotor which is rotatable relative to the stator, wherein the rotor comprises a plurality of permanent magnets. The electric machine furthermore comprises a rotor-cooling apparatus for cooling the rotor, wherein the rotor-cooling apparatus has at least one cooling device for providing a cooling-air flow. The present invention also relates to a generator arrangement having such an electric machine. Finally, the present invention relates to a wind turbine having such a generator arrangement.

In the present case, interest is directed toward permanently excited electric machines which are used as generators. For example, such electric machines may be used as generators in wind turbines, During electric machine operation, it may be the case that these are being operated above the nominal rotational speed. This is the result for example if the electric machine is used in a wind turbine and high rotational speeds occur as a result of gusts of wind. In particular if the electric machine is designed as a permanently excited synchronous machine, the pole wheel voltage increases significantly in the case of high rotational speeds. If the electric machine is connected on the outlet side to a converter or to a converter apparatus, this can lead to damage in the converter. This applies in particular if the temperature of the permanent magnets is low since in this case the pole wheel voltage is particularly high.

With electric machines at the converter, the terminal voltage can be limited at least in part by field weakening such that damage to the converter is prevented. Moreover, the electric machine can be designed such that, for the same power, a relatively low pole wheel voltage is generated. For this purpose, the electric machine or the stator of the electric machine may have a relatively small number of windings. However, a low pole wheel voltage often leads to disadvantages with the design. A relatively small power factor may in particular be the result.

It is possible for permanently excited electric machines or generators to be operated instead of at a fully controlled converter also at a pure rectifier. This is normally more cost-effective. However, here there is the disadvantage that the field weakening is set via the operating point and cannot therefore be altered during operation.

It is an object of the present invention to reveal a solution with which a permanently excited electric machine can be operated more reliably as a generator.

SUMMARY OF THE INVENTION

Said object is achieved according to the invention by an electric machine, by a generator arrangement and by a wind turbine according to the features of the respective independent claims. Advantageous refinements of the present invention are the subject of the dependent claims.

An electric machine according to the invention comprises a stator. The electric machine furthermore comprises a rotor which is rotatable relative to the stator and which comprises a plurality of permanent magnets. The electric machine also comprises a rotor-cooling apparatus for cooling the rotor, wherein the rotor-cooling apparatus has at least one cooling device for providing a cooling-air flow. The rotor-cooling apparatus furthermore comprises a control device which is designed to actuate the at least one cooling device for setting a cooling power provided by the cooling-air flow.

The electric machine is designed as a permanently excited electric machine. This means that the rotor of the electric machine comprises a plurality of permanent magnets. The electric machine moreover has the stator, which may have for example a corresponding winding. For example, the electric machine may be designed as a permanently excited synchronous machine. It is preferably possible for the electric machine to be used as a generator, for example in a wind turbine. The electric machine also comprises the rotor-cooling apparatus, which serves for cooling the rotor during the operation of the electric machine. The rotor-cooling apparatus comprises the at least one cooling device by means of which a cooling-air flow for cooling the rotor is provided. In other words, cooling air is supplied to the rotor by way of the at least one cooling device. In particular, an inner circulation flow is generated by way of the at least one cooling device. The cooling-air flow is thus preferably guided within a housing of the electric machine. A cooling power is therefore provided by the cooling-air flow and acts on the rotor or cools the latter.

According to an essential aspect of the present invention, the rotor-cooling apparatus has a control device by means of which the at least one cooling device is able to be actuated. In this way, the cooling power provided by the at least one cooling device and acting on the rotor can be set. In particular, the cooling power can be set independently of a rotational speed of the rotor. In comparison with known rotor-cooling apparatuses, which comprise for example fans arranged on the shaft, this makes it possible to set the cooling power independently of the rotational speed of the rotor. For example. It can thus be achieved that the permanent magnets of the rotor are not cooled or cooled to a smaller extent in case said magnets have a relatively low temperature. It can thus be achieved that the permanent magnets are heated and consequently the pole wheel voltage reduced. In this way, reliable operation can be made possible even at rotational speeds above the nominal rotational speed of the electric machine, without the threat of damage to the electric machine or to a converter arranged downstream.

In one embodiment, the rotor-cooling apparatus has, as the at least one cooling device, a fan with a fan impeller for conveying the cooling-air flow and with a fan motor for driving the fan Impeller, wherein the control device is designed to actuate the fan motor for setting the cooling power. Thus, the rotor-cooling apparatus may have a fan as the at least one cooling device. The cooling-air flow can be conveyed by said fan. The fan in turn comprises a fan impeller which can be driven by the fan motor. The fan impeller is not connected to the shaft of the electric machine. In order to be able to set the cooling power which acts on the rotor, the control device is able to actuate the fan motor. The fan motor is preferably designed as an electric machine. It may also be provided that the control device actuates a separate converter, which is connected to the fan motor. For example, the control device is able to activate and/or deactivate the fan motor. It may also be provided that the control device is able to set a rotational speed of the fan motor. In this way, the volume flow of the cooling air and thus the imparted cooling power can be controlled.

In a further embodiment, the rotor-cooling apparatus has, as the at least one cooling device, a re-cooler for cooling the cooling-air flow, wherein the control device is designed to actuate the re-cooler for setting the cooling power. The rotor-cooling apparatus may have the re-cooler as the at least one cooling device. In particular, it is provided that the cooling apparatus comprises both the fan and the re-cooler as cooling devices. With the aid of the re-cooler, the air, which for example has been heated by the rotor, can be re-cooled. The re-cooler may be designed as a heat exchanger. The heat exchanger may be flowed through by a cooling medium by way of which the cooling-air flow supplied to the heat exchanger can be cooled. It may also be provided that the control device actuates the heat exchanger or the re-cooler such that said heat exchanger or re-cooler does not cool the coding-air flow. In this case, no cooling medium can be supplied to the heat exchanger. With the aid of the control device, the re-cooler can be actuated and thereby influenced in terms of the extent to which the cooling-air flow is cooled by means of the re-cooler. For this purpose, the volume flow of the coolant, which flows through the re-cooler, can be set for example by means of the control device. This allows simple and reliable adjustment of the temperature of the cooling-air flow. It is also possible for the volume flow of the coolant to be completely blocked, for example by a valve.

Preferably, the cooling apparatus has at least one air-guiding element, which guides the cooling-air flow cooled by the re-cooler to the rotor. Thus, the cooling air cooled by the re-cooler can be guided directly to the rotor. In this way, the permanent magnets of the rotor can be optimally cooled if these have been heated during the operation of the electric machine. It may also be provided that the cooling-air flow cooled by the heat exchanger is guided firstly to the fan and subsequently to the rotor. For reducing the axial length of the electric machine, it may be necessary that the cooling air, after passing through the heat exchanger and possibly the fan, is guided via at least one stator winding head before passing to the magnets. The electric machine may have a housing, in which the at least one air-guiding element is arranged. In particular, multiple air-guiding elements are provided in the housing of the electric machine. Said air-guiding elements serve for guiding the coolant flow to the rotor.

Here, it is provided in particular that the at least one air-guiding element is designed to guide the cooling-air flow in a radial direction of the electric machine to a central region of the rotor. Thus, with the aid of the fan, the coolant flow can be guided from the re-cooler to the rotor. It may be provided in this case that the coolant flow is guided between the housing of the electric machine and the air-guiding elements. In particular, it is intended that the cooling-air flow impinges centrally on the rotor in a radial direction. The permanent magnets of the rotor can thereby be cooled efficiently.

In a further embodiment, the electric machine has at least one cooling duct which guides along the rotor in an axial direction of the electric machine the cooling-air flow guided to the rotor. The rotor may for example have a laminated core on which the permanent magnets are held. The at least one cooling duct may be formed in said laminated core. It may also be provided that the at least one cooling duct is formed by an air gap between the rotor and the stator. As already explained, it is intended that the cooling-air flow is guided centrally to the rotor from the heat exchanger. From there, cooling-air flow can be guided outwardly from the center on both skies along the axial direction of the electric machine. In this way, the permanent magnets in the rotor can be cooled from the inside or the center outward. Subsequently, the cooling air can then be guided to the re-cooler again in order for the cooling air to be correspondingly cooled.

Alternatively, it may be provided that the cooling-air flow is guided by the at least one air-guiding element in a radial direction to a first side region of the rotor, Here too, it is then possible for provision to be made of at least one cooling duct through which the cooling-air flow is guided along the rotor in an axial direction. It is thereby possible for the cooling-air flow to be guided for example from the first side region to an opposite second side region of the rotor. In this configuration too, efficient cooling of the permanent magnets can be achieved.

It is furthermore advantageous if the at least one air-guiding element is designed to guide the cooling-air flow from the rotor to the re-cooler. As already explained, it is possible for the cooling-air flow to be guided along the rotor in an axial direction. The cooling-air flow can subsequently be guided in the direction of the re-cooler. It may also be provided here that the cooling-air flow is guided from the rotor to the winding heads of the stator, or parts of the stator. It is thus also possible for the stator to be cooled, at least partially.

Preferably, the control device is designed to determine a temperature of the permanent magnets and to set the cooling power in a manner dependent on the temperature of the permanent magnets. This makes it possible to set the cooling power, which is provided by means of the rotor-cooling apparatus, in a manner dependent on the present temperature of the permanent magnets. Here, it may be provided that the permanent magnets are not cooled, or are cooled only to a small extent, by means of the rotor-cooling apparatus if the permanent magnets have a relatively low temperature. It can thus be achieved that the permanent magnets are heated up during the operation of the electric machine, as a result of which the pole wheel voltage can be reduced. If the permanent magnets have been heated during the operation of the electric machine, the cooling power can be increased for the purpose of correspondingly cooling the permanent magnets. This allows the flux of the magnets to be utilized better and the magnets to be protected against demagnetization.

Preferably, the control device is designed to determine a rotational speed of the rotor, a terminal voltage prevailing at the stator and/or a current flowing through the stator and to determine the temperature of the permanent magnets on the basis of a model, which model describes the temperature of the permanent magnets as a function of the rotational speed, of the terminal voltage and/or of the current. The temperature of the permanent magnets is dependent on the rotational speed of the rotor, on the terminal voltage which can be tapped off at the stator and/or on the electric current which flows through the winding of the stator. Said variables can be measured for example with the aid of corresponding sensors and transmitted to the control device. A model which describes the present temperature of the permanent magnets as a function of the measured rotational speed, the terminal voltage and/or the current may be stored in the control device. When determining the temperature of the permanent magnets, the temperature in the surroundings of the electric machine and/or an operating duration of the electric machine may also be taken into account. This makes possible reliable determination of the temperature of the permanent magnets. Alternatively, provision may be made for the temperature of the permanent magnets to be determined directly by at least one temperature sensor.

According to a further embodiment, the electric machine has a stator-cooling apparatus for cooling the stator. It is preferably possible for said stator-cooling apparatus to be provided by a water jacket cooling means. Said water jacket cooling means may be arranged on an outer side of the stator and at least regionally surround the stator. Alternatively, corresponding cooling tubes may be arranged in the laminated core of the stator and/or on an outer side of the stator. With the aid of the stator-cooling apparatus, it is possible to achieve efficient cooling of the stator during operation.

As already mentioned, the electric machine is preferably designed as a permanently excited synchronous machine. Furthermore, it is provided in particular that the electric machine is designed as a medium-speed generator or is operated as such a generator. This means in particular that the generator is operated in a rotational speed range between 200 and 700 revolutions per minute. In particular here, the water jacket cooling means in combination with a separate re-cooler with fan is particularly advantageous since the conveying volume of fans mounted on the shaft would not ensure a sufficiently large inner air flow. Due to this relatively low nominal rotational speed, said generators often have a large number of poles. Electric machines having a large number of poles generally have a small stator yoke height and thus high thermal conductivity from the stator to the water jacket. This has an advantageous effect on the heat dissipation of the stator.

A generator arrangement according to the invention comprises an electric machine according to the invention and a converter apparatus for converting an electrical voltage provided by the electric machine in generator mode. In the generator mode of the electric machine, an alternating-current voltage is provided. With the aid of the converter apparatus, said alternating-current voltage can be adjusted to a grid voltage of a grid into which the voltage is intended to be fed. It is also possible with the aid of the converter apparatus for the terminal voltage to be limited by field weakening. Moreover, the electric machine can be operated such that no critical excessive rotational speeds can occur as long as the temperature of the permanent magnets is below a predetermined target temperature. This can be achieved for example in that the rotational speed is limited.

Preferably, the converter apparatus comprises a rectifier, which is electrically connected to the electric machine. To compensate for the reactive power, at least one capacitor may be connected to the electric machine. With the aid of the rectifier, the alternating-current voltage which is provided by the electric machine can firstly be rectified, Subsequently, the rectified voltage can be converted into an alternating-current voltage having the grid frequency. Here, it is possible to provide additional capacitors for compensating the reactive power and for increasing the breakdown torque. Said capacitors may, for example, in each case be switched between the individual phases. The capacitors allow the losses to be reduced and thus for example the rotational speed to be increased.

A wind turbine according to the invention comprises a generator arrangement according to the invention. In particular in the case of wind turbines, rotational speeds above the nominal rotational speed can occur as a result of gusts. The rotor-cooling apparatus makes it possible to prevent the situation in which the permanent magnets are excessively cold and a high pole wheel voltage is consequently the result.

The preferred embodiments presented with reference to the electric machine according to the invention, and the advantages thereof, correspondingly apply to the generator arrangement according to the invention and to the wind turbine according to the invention.

Further features of the invention will emerge from the claims, the figures and the description of the figures. The features and feature combinations mentioned above in the description and the features and feature combinations mentioned below in the description of the figures and/or shown in the figures alone are able to be used not only in the respectively specified combination but also in other combinations or individually without departing from the scope of the invention.

BRIEF DESCRIPTION OF THE DRAWING

The invention will now be explained in more detail on the basis of preferred exemplary embodiments and with reference to the appended drawings, in which.

DETAILED DESCRIPTION OF PREFERRED EMBODIMENTS

In the figures, identical and functionally identical elements are provided with the same reference signs.

Figure 1:
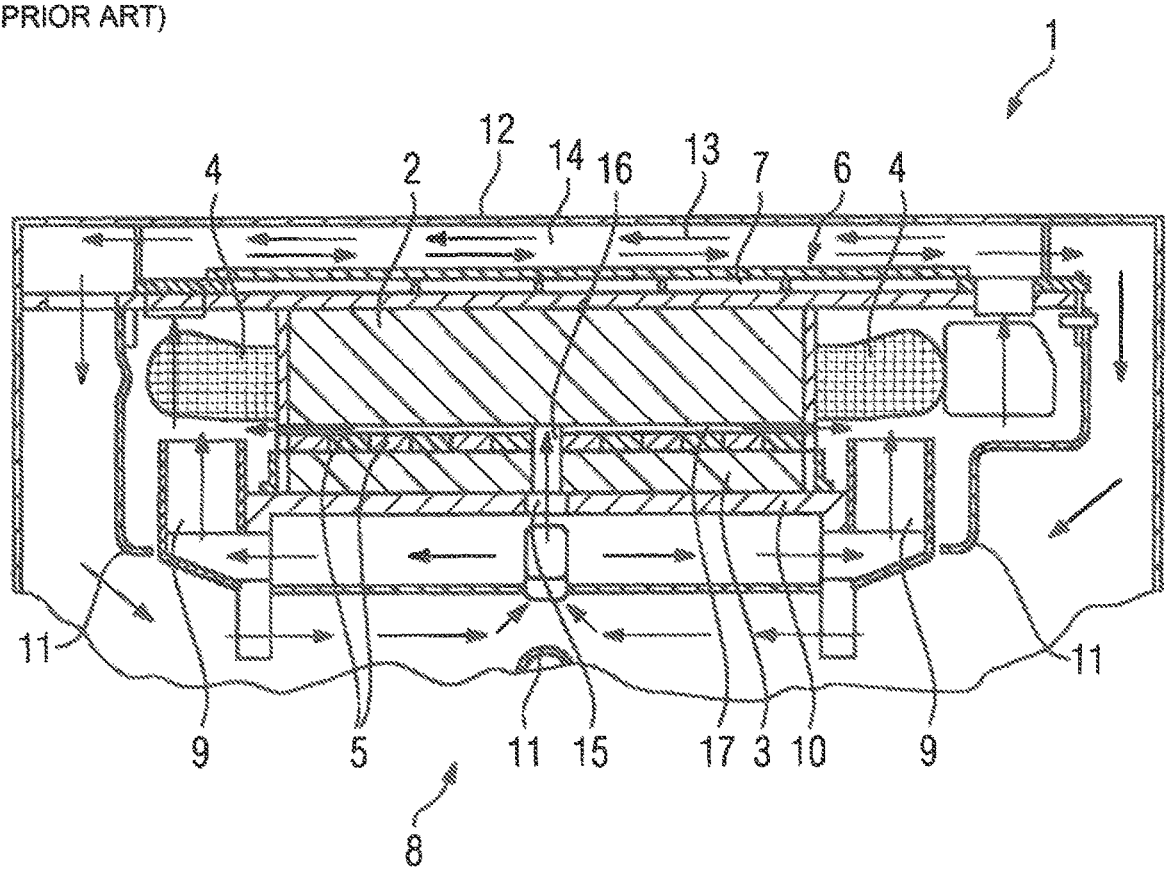
FIG. 1 shows an electric machine according to the prior art in a sectioned side view.

FIG. 1 shows an electric machine 1 according to the prior art in a sectioned side view. The electric machine 1 comprises a stator 2 which has a winding. In the present case, winding heads 4 of the winding can be seen. The electric machine 1 furthermore comprises a rotor 3 which can be rotated relative to the stator 2. The rotor 3 comprises a plurality of permanent magnets 5. The electric machine 1 may be designed as a permanently excited synchronous machine. The electric machine 1 is preferably used as a generator, in particular in a wind turbine.

The electric machine 1 also comprises a stator-cooling apparatus 6 which serves for cooling the stator 2. In the present case, the stator-cooling apparatus 6 comprises a water jacket cooling means 7 which circumferentially surrounds the stator 2. Moreover, the electric machine 1 comprises a rotor-cooling apparatus 8 which serves for cooling the rotor 3 and in particular for cooling the permanent magnets 5. The rotor-cooling apparatus 8 comprises in the present case two fan elements 9 which are connected rotationally conjointly to a shaft 10 of the electric machine 1. A cooling-air flow for cooling the rotor 3 can be provided with the aid of the fan elements 9, The rotor-cooling apparatus 8 furthermore comprises a plurality of air-guiding elements 11 which serve for guiding the cooling-air flow. Furthermore, the cooling-air flow is also guided through parts of the housing 12 of the electric machine 1, In the present case, two opposing cooling-air flows, which are illustrated by the arrows 13, are obtained in an inner space of the housing 12.

The cooling-air flow is guided past the winding heads 4 of the stator 2, and parts of the stator 2, from the respective fan elements 9, The cooling-air flow is subsequently guided through a duct 14, wherein here, the cooling-air flow in the duct 14 is guided along the water-cooling means 7 and thereby cooled. The cooling-air flow is then diverted into a radial direction r of the electric machine 1 and subsequently into an axial direction a of the electric machine 1 through the housing 12 and the air-guiding element 11. Afterwards, the cooling-air flow is diverted back into a radial direction r to the rotor 3 such that said flow impinges on a central region 15 of the rotor 3. In the central region 15, the rotor 3 or a laminated core of the rotor 3 has a duct 16 which extends in a radial direction r. The cooling-air flow is then guided outwardly from the center or the central region 15 of the rotor 3 back in an axial direction a. For this purpose, the electric machine 1 has a cooling duct 17 through which the cooling-air flow is guided in an axial direction a. In the present case, said cooling duct 17 is formed by an air gap between the stator 2 and the rotor 3. Alternatively or additionally, a cooling duct for guiding the cooling-air flow in an axial direction a may be provided in the laminated core of the rotor.

Figure 2:
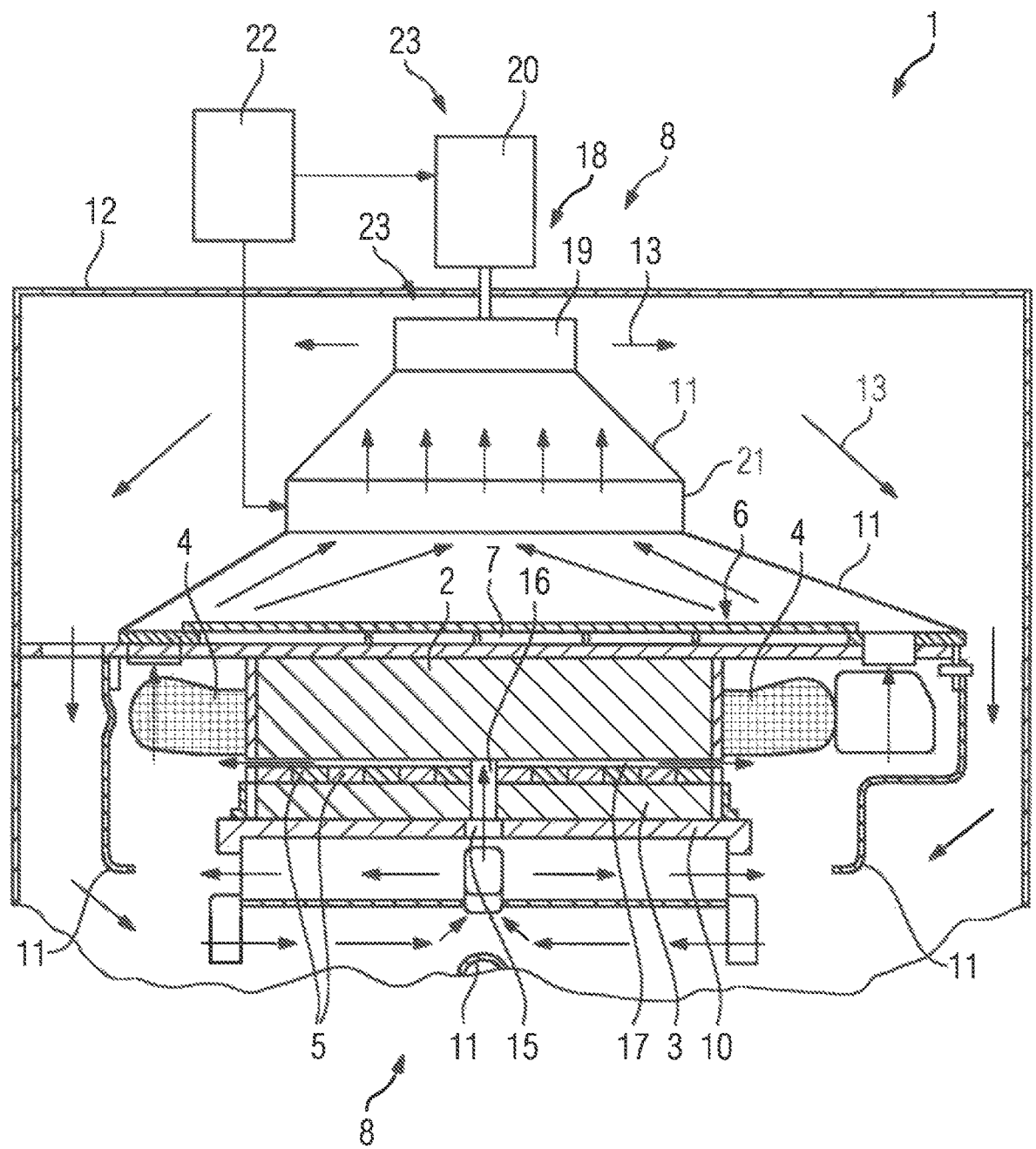
FIG. 2 shows an electric machine according to an embodiment of the invention in a sectioned side view.

FIG. 2 shows an electric machine 1 according to an embodiment of the invention in a sectioned side view. The electric machine 1 differs from the electric machine 1 according to FIG. 1 with respect to the rotor-cooling apparatus 8. In this case, the rotor-cooling apparatus 8 has no fan elements 9 connected to the shaft 10. Here, the rotor-cooling apparatus 8 has a fan 18 which in turn comprises a fan impeller 19 and a fan motor 20. The rotor-cooling apparatus 8 furthermore comprises a re-cooler 21, which may be designed for example as a heat exchanger. The fan 18 and the re-cooler 21 are cooling devices 23 of the rotor-cooling apparatus 8 that are able to be used to provide the cooling-air flow.

The rotor-cooling apparatus 8 also comprises a control device 22, by means of which the fan motor 20 of the fan 18 can be actuated. The fan motor 20 can be activated and deactivated by means of the control device 22. In this way, the volume flow of the cooling-air flow can be influenced. Furthermore, a rotational speed of the fan motor 20 can be set with the aid of the control device 22. It is also possible for the re-cooler 21 to be actuated by means of the control device 22. In this way, the cooling power by means of which the cooling-air flow is cooled by the re-cooler 21 can be influenced. Overall, the cooling-air flow or the inner circulation air can be influenced by the actuation of the fan 18 and/or of the re-cooler 21. It is thus possible for the cooling power by way of which the permanent magnets 5 are cooled by the cooling-air flow to be set.

In the present case, the cooling-air flow is guided from the rotor 3 past the winding heads 4 to the re-cooler 21. Here, the cooling-air flow, which has been heated by the rotor 3, can be cooled. For the purpose of guiding the cooling-air flow to the re-cooler 21, corresponding air-guiding elements 11 are provided. The cooling-air flow subsequently passes to the fan 18 and is guided from the latter along the housing 12, firstly in an axial direction a and subsequently in an axial direction r. Afterwards, as already explained above in connection with FIG. 1, the cooling-air flow impinges centrally on the rotor 3 in order to cool the rotor and in particular the permanent magnets 5.

In the case of the electric machine 1 according to FIG. 2, the cooling power which is imparted by the rotor-cooling apparatus 8 is independent of the rotational speed of the electric machine 1. Furthermore, the cooling power of the rotor-cooling apparatus 8 is substantially independent of the stator-cooling apparatus 6. Due to the separation of the water jacket cooling means 7 of the stator-cooling apparatus 8 and the inner circulation air, which is provided by the rotor-cooling apparatus 8, the heating of the stator 2 and the rotor 3 can be controlled in a manner substantially separate from one another. Due to the cooling of the stator 2, losses can be reduced. In general here, the best possible cooling for the stator 2 is desired.

The cooling of the rotor 3 by the rotor-cooling apparatus 8 can be controlled in a manner dependent on the present temperature of the permanent magnets 5. For example, the inner circulation air for cooling the permanent magnets 5 can be reduced if the permanent magnets 5 have a relatively low temperature or a temperature below a predetermined target temperature. This can be achieved in the present case in that the fan motor 20 is controlled by means of the control device 22 such that the fan motor 20 is deactivated or the rotational speed of the fan motor 20 is reduced. It may also be provided that the control device 22 actuates the re-cooler 21 such that the cooling power provided by the re-cooler 21 and acting on the cooling-air flow is reduced. In this way, it can be achieved that the permanent magnets 5 heat up significantly during operation and the pole wheel voltage is consequently reduced. If the permanent magnets 5 have reached a sufficiently high temperature, they can be correspondingly cooled by means of the rotor-cooling apparatus 8 in order to reduce losses. Said losses in the rotor 3 are substantially dependent only on the rotational speed.

The electric machine 1 can then be operated such that no critical excessive rotational speeds can occur as long as the permanent magnets 5 have a relatively low temperature. The cooling power provided by the rotor-cooling apparatus 8 can moreover be set by the control device 22 in a manner dependent on the present temperature of the permanent magnets 5. For this purpose, the control device 22 can receive measurement variables which describe the terminal voltage at the stator 2, an electrical current flowing through the winding of the stator 2 and/or the rotational speed of the rotor 3. Said measurement variables can be determined and/or measured, and transferred to the control device 22. Using these measurement variables, the present temperature of the permanent magnets 5 can then be determined on the basis of a model. Alternatively, a temperature sensor can be used to determine the present temperature of the permanent magnets 5. Due to the reduction in the cooling power imparted by the rotor-cooling apparatus 8, the permanent magnets 5 can be heated, and the electric machine 1 can be operated such that high excessive rotational speeds can occur.

Figure 3:
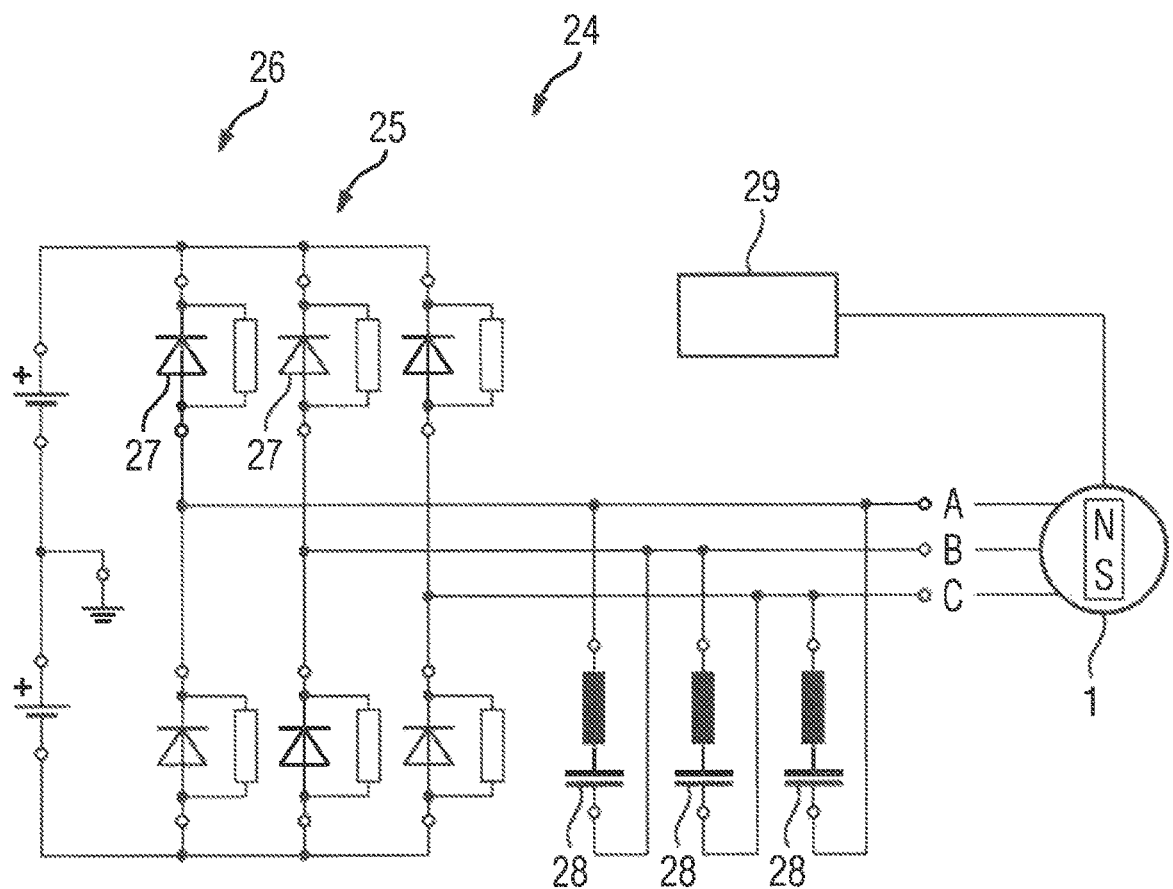
FIG. 3 shows a schematic illustration of a generator arrangement according to an embodiment of the invention.

This effect is particularly advantageous if the electric machine 1 is operated at a rectifier 25. For this purpose, FIG. 3 shows a schematic illustration of a generator arrangement 24. The generator arrangement 24 comprises the electric machine 1, wherein the electric machine 1 or the stator 2 comprises the terminals A, B and C. If the electric machine 1 is operated in generator mode, an alternating-current voltage can be tapped off at each of the terminals A, B, C.

The electric machine 1 is connected to the rectifier 25, which serves for rectifying the alternating-current voltages. The rectifier 25 is designed as a bridge rectifier and comprises six diodes 27. The rectifier 25 is part of a converter apparatus 26, which may additionally have an inverter by means of which it is possible to convert into a grid voltage with a grid frequency the direct-current voltage at the output of the rectifier 24. The grid voltage can thereby be fed into a power grid. The generator arrangement 24 also comprises the device 29 by means of which the rotational speed of the rotor 3 can be detected. The generator arrangement 24 furthermore comprises three capacitors 28, wherein in each case one of the capacitors 28 is switched between two terminals A, B, C. The capacitors 28 allow the reactive power to be compensated and the breakdown torque to be increased.

The generator arrangement 24 according to the invention or the electric machine 1 according to the invention may be used in particular for wind turbines. Here, excessive rotational speeds can occur as a result of gusts. The independent rotor-cooling apparatus 8 makes it possible to prevent the situation in which the permanent magnets 5 have an excessively low temperature and high pole wheel voltages thus occur. Consequently, damage to the rectifier 25 can be prevented.

The invention claimed is:

1. An electric machine, comprising:
a stator;
a rotor rotatable to the stator and including a plurality of permanent magnets;
a rotor-cooling apparatus for cooling the rotor, said rotor-cooling apparatus including a first cooling device configured to provide a cooling-air flow, a second cooling device in the form of a re-cooler for cooling the cooling-air flow, an air-guiding element configured to guide the cooling-air flow, cooled by the re-cooler, to the rotor in a radial direction of the electric machine to a central region of the rotor and to guide the cooling-air flow from the rotor to the recooler;
a cooling duct configured to guide the cooling-air flow, guided to the rotor, outwardly along the rotor from the central region in an axial direction of the electric machine; and
a stator cooling apparatus for cooling the stator;
wherein the first cooling device comprises a fan which includes a fan impeller for conveying the cooling-air flow and a fan motor for driving the fan impeller so that a cooling power imparted by the rotor-cooling apparatus is independent of a rotational speed of the electric machine and the cooling power of the rotor-cooling apparatus is independent of the stator cooling apparatus.

2. The electric machine of claim 1, wherein the stator-cooling apparatus is in a circumferential surrounding relation to the stator for cooling the stator.

3. A generator arrangement, comprising:
an electric machine comprising a stator, a rotor rotatable relative to the stator and including a plurality of permanent magnets, a rotor-cooling apparatus for cooling the rotor, said rotor-cooling apparatus including a first cooling device configured to provide a cooling-air flow, a second cooling device in the form of a re-cooler for cooling the cooling-air flow, an air-guiding element configured to guide the cooling-air flow, cooled by the re-cooler, to the rotor in a radial direction of the electric machine to a central region of the rotor and to guide the cooling-air flow from the rotor to the re-cooler, and a cooling duct configured to guide the cooling-air flow, guided to the rotor, outwardly along the rotor from the central region in an axial direction of the electric machine;
a converter apparatus configured to convert an electrical voltage provided by the electric machine in generator mode; and
a stator cooling apparatus for cooling the stator; wherein the first cooling device comprises a fan which includes a fan impeller for conveying the cooling-air flow and a fan motor for driving the fan impeller so that a cooling power imparted by the rotor-cooling apparatus is independent of a rotational speed of the electric machine and the cooling power of the rotor-cooling apparatus is independent of the stator cooling apparatus.

4. The generator arrangement of claim 3, wherein the converter apparatus comprises a rectifier, which is electrically connected to the electric machine, and a capacitor for compensating a reactive power.

5. The generator arrangement of claim 3, wherein the stator-cooling apparatus is in a circumferential surrounding relation to the stator for cooling the stator.

6. A wind turbine, comprising a generator arrangement, said generator arrangement comprising an electric machine and a converter apparatus configured to convert an electrical voltage provided by the electric machine in generator mode, said electric machine including a stator, a rotor rotatable relative to the stator and including a plurality of permanent magnets, a rotor-cooling apparatus for cooling the rotor, said rotor-cooling apparatus including a first cooling device configured to provide a cooling-air flow, a second cooling device in the form of a re-cooler for cooling the cooling-air flow, an air-guiding element configured to guide the cooling-air flow, cooled by the re-cooler, to the rotor in a radial direction of the electric machine to a central region of the rotor and to guide the cooling-air flow from the rotor to the re-cooler, a cooling duct configured to guide the cooling-air flow, guided to the rotor, outwardly along the rotor from the central region in an axial direction of the electric machine, and a stator cooling apparatus for cooling the stator, wherein the first cooling device comprises a fan which includes a fan impeller for conveying the cooling-air flow and a fan motor for driving the fan impeller so that a cooling power imparted by the rotor-cooling apparatus is independent of a rotational speed of the electric machine and the cooling power of the rotor-cooling apparatus is independent of the stator cooling apparatus.

7. The wind turbine of claim 6, wherein the converter apparatus comprises a rectifier, which is electrically connected to the electric machine, and a capacitor for compensating a reactive power.

8. The wind turbine of claim 6, wherein the stator-cooling apparatus is in a circumferential surrounding relation to the stator for cooling the stator.

9. The electric machine of claim 2, wherein the stator-cooling apparatus is a water jacket.

10. The generator arrangement of claim 5, wherein the stator-cooling apparatus is a water jacket.

11. The wind turbine of claim 8, wherein the stator-cooling apparatus is a water jacket.

\* \* \* \* \*